UNITED STATES PATENT OFFICE.

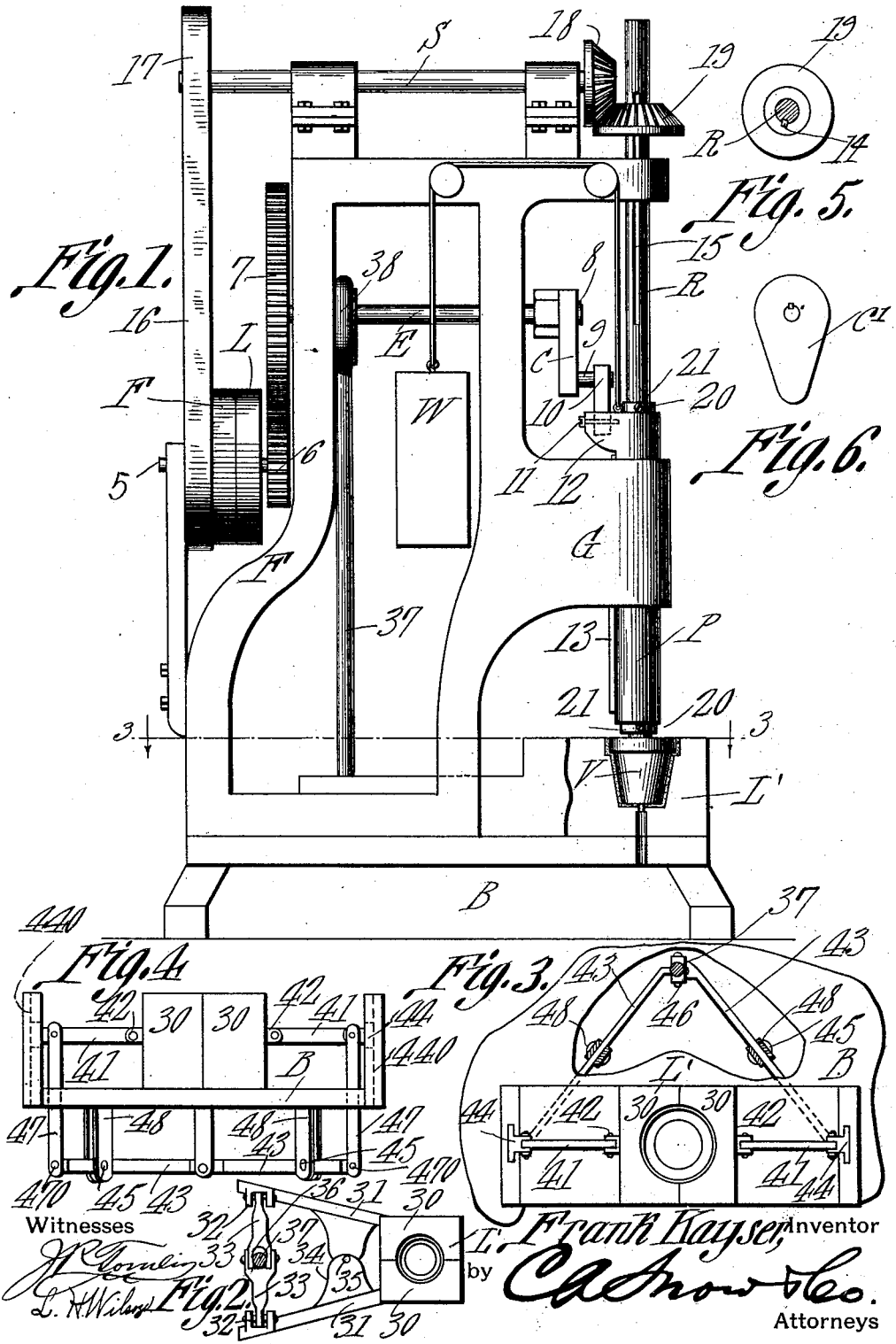

FRANK KAYSER, OF TOLEDO, OHIO.

POTTERY-MACHINE.

1,024,511.  Specification of Letters Patent.  Patented Apr. 30, 1912.

Application filed February 16, 1911. Serial No. 608,917.

*To all whom it may concern:*

Be it known that I, FRANK KAYSER, a citizen of the United States, residing at Toledo, in the county of Lucas and State of Ohio, have invented a new and useful Pottery-Machine, of which the following is a specification.

This invention relates to improvements in pottery machines of that type which employ a rotary former; and the object of the same is to produce improvements in machines of this character, more especially in the female die thereof and the method of actuating the male die. These objects I accomplish by the construction hereinafter more fully described and claimed, and as shown in the drawings wherein:—

Figure 1 is a side elevation of this machine complete. Fig. 2 is a plan view of the female die and one type of mechanism for moving its parts laterally. Fig. 3 is a similar view, taken partly in section on the line 3—3 of Fig. 1, and showing another type of the means for moving the parts of the female die laterally. Fig. 4 is a front elevation of the construction shown in Fig. 3, viewed from the bottom of the latter view. Figs. 5 and 6 are detailed views to be referred to hereinafter.

In the drawings, the letter F designates broadly the framework mounted on a base B and having a guide G in which reciprocates a plunger P whose movements raise and lower a rod R which carries a vertically moving or male die V. It is to be understood that power is applied from any suitable source to the fast pulley F′ or the loose pulley L, and is communicated to a counter shaft S which in turn rotates the rod R and to an eccentric or crank shaft E which in turn, through a crank C or a cam C′, reciprocates the plunger P vertically, and said plunger is counter-balanced by a weight W or similar device. All these elements broadly speaking are well known in this art, although details of their structure is described below; but the present invention consists mainly in the structure of the female or laterally movable die L′, and the mechanism by which its parts are reciprocated.

The power shaft 5 carries a gear 6 which in turn meshes with a gear 7 on the shaft E, and keyed to the latter at 8 is the crank C shown in Fig. 1 (or it may be a cam C′ as shown in Fig. 6) whose function is to depress the plunger P against the tension of the weight W or some similar device on each revolution of said shaft E. If the crank C be employed as shown in Fig. 1, its crank 9 must be connected by a pitman 10 with a pivot 11 in the head 12 of the plunger P, which latter is guided by a spline 13 moving within the guide G in a manner which will be understood; but if the cam C′ of Fig. 6 be substituted for the crank C, its high face will bear upon the head 12 and its periphery will be shaped to give the necessary movements to the plunger. The power shaft 5 is also belted as at 16 to a pulley 17 on the counter shaft S which is here shown as carrying a gear 18 meshing with another gear 19 which has a spline 14 projecting into a groove 15 in the rod or shaft R so that the latter may rise and fall through the gear 19 but will always be rotated by it; and the relation of this gear to that numbered 18 and the arrangement of the belting and pulleys is such as to give the shaft R revolution at a proper speed to effect the end desired. Said shaft is caused to reciprocate vertically with the plunger P by any suitable means, and herein I have shown collars 20 secured upon the shaft R by set screws 21 above and below said plunger, although it will be understood that other equivalent devices for the same purpose might be substituted. The lower end of the rod or shaft R carries the vertically moving die V which is here the male member that forms the interior of the flower pot as shown in section in Fig. 1, and a female member L′ best illustrated in Figs. 2, 3 and 4 forms the outside of the said pot and is made in halves which are caused to reciprocate laterally by the mechanism which will next be described. I do not wish to be limited, however, to any particular form of dies, as it will be obvious that differently shaped male and female members may be substituted for those shown in the drawings, when it is desired to form other articles than flower pots.

In Fig. 2 the female die L′ is shown in two halves 30 each carried by an arm 31 which has a pair of ears 32 between which is pivoted one link 33 of the mechanism for swinging the arms and moving the die members 30. Said arms are here shown as having off-sets 34 mounted on a common pivot 35 so that they may swing between their extremities, one of which carries the die member and the other of which the ears just mentioned. The two links 33 herein shown are connected by a common pivot 36 so as to form them into the shape of a toggle-lever, and from the pivot thereof rises a rod 37 which leads upward to an eccentric 38 mounted on the eccentric shaft E. Hence when the latter rotates the eccentric will cause the rod to rise and fall, and as it rises it will lift the common pivot 36 of the toggle lever and approach the rear ends of the arms 31 so as to cause the die members 30 to move away from each other; and as the eccentric moves to its other extreme this motion will be reversed and the die members will be caused to approach each other so as to finally come together upon the outside of the flower pot being formed. It is to be understood that the parts of this machine are so timed that this action takes place concurrently with the descent of the plunger and rod carrying the male die V, the latter being meanwhile rotated by the counter shaft S and the gears 18 and 19 so that it constitutes a rotary former to shape the interior of the flower pot being made.

The construction illustrated in Figs. 3 and 4 is much the same excepting that the two halves 30 of the female die L' here move laterally on a straight line instead of swinging around a common pivot 35, and the lever mechanism for causing them to do so must be modified accordingly. Referring to these views by reference letters, therefore, each half 30 of the die has an ear 42 to which is pivoted the inner end of an arm 41 whose outer end is pivoted to a block 44 movable vertically in an upright groove 440, and the block is caused to rise and fall by means of a link 47 pivoted to it and whose lower end is pivoted at 470 to the outer extremity of a lever 43. The latter in turn is pivoted at 45 in a hanger 48 depending from the bed or base B, and the remote extremities of both these levers are connected by a common pivot 46 with the lower end of the rod 37. The latter is reciprocated vertically by the means described above. Hence it will be seen that as the levers 43 rock on their pivots 45 the links 47 cause the blocks 44 to rise and fall within their grooves, and the result is that the arms 41 cause the halves 30 of the female die L to reciprocate from and toward each other across the upper face of the base B. Here again the parts are timed in the manner above set forth.

It will hardly be necessary to go into a minute description of the operation of the machine, for those who are well versed in this art will understand its workings. Obviously the interior of the vessel must be round in order that the male die member V may rotate therein, but it is quite possible that the exterior of the vessel being formed might be of other shapes than those which would be given it by the female die members herein shown. Thus is built up a machine which both automatically forms the exterior and interior of the article being produced, and simultaneously compresses its walls if it be conical in shape as shown, because the descent of the plunger and vertically movable die is controlled by the length of the crank C or the shape of the face of the cam C'. If the article being produced is rather flat it may be sufficient to use the crank; on the other hand, if the article be rather deep I should say that the cam would be preferred.

The sizes, shapes, and other details of construction of this machine are matters of no moment.

What is claimed as new is:

In a pottery making machine, the combination of a base, a frame disposed thereabove, a power shaft, a horizontal shaft journaled at the upper end of the frame, another horizontal shaft shorter in length and journaled below and parallel to the first horizontal shaft within the frame, both of said horizontal shafts being operably connected to the power shaft, a vertical shaft operably connected to the first horizontal shaft and capable of a vertical reciprocatory movement, a plunger secured to the said vertical shaft and in which said vertical shaft is permitted to rotate, a rod connected to said plunger, a crank carried by the second horizontal shaft connected to the other end of said rod to impart to the plunger and vertical shaft a vertical reciprocatory movement, a male die carried upon the lower end of the vertical shaft, a counter balancing means mounted in the frame and connected to the plunger, a sectional female die disposed upon the base, a rod connected to said sections, and an eccentric connected to the second horizontal shaft and said rod to actuate the rod to cause the sections of the female die to move to and from each other.

In testimony that I claim the foregoing as my own, I have hereto affixed my signature in the presence of two witnesses.

FRANK KAYSER.

Witnesses:
MARTHA HOWE,
DANIEL H. JAMES.